June 23, 1964 — E. SWANSON — 3,138,329

AGRICULTURAL SPRAYING APPARATUS

Filed Nov. 19, 1962 — 3 Sheets-Sheet 1

INVENTOR
ELY SWANSON
BY
Fetherstonhaugh & Co.
ATTORNEYS

June 23, 1964 E. SWANSON 3,138,329
AGRICULTURAL SPRAYING APPARATUS
Filed Nov. 19, 1962 3 Sheets-Sheet 2
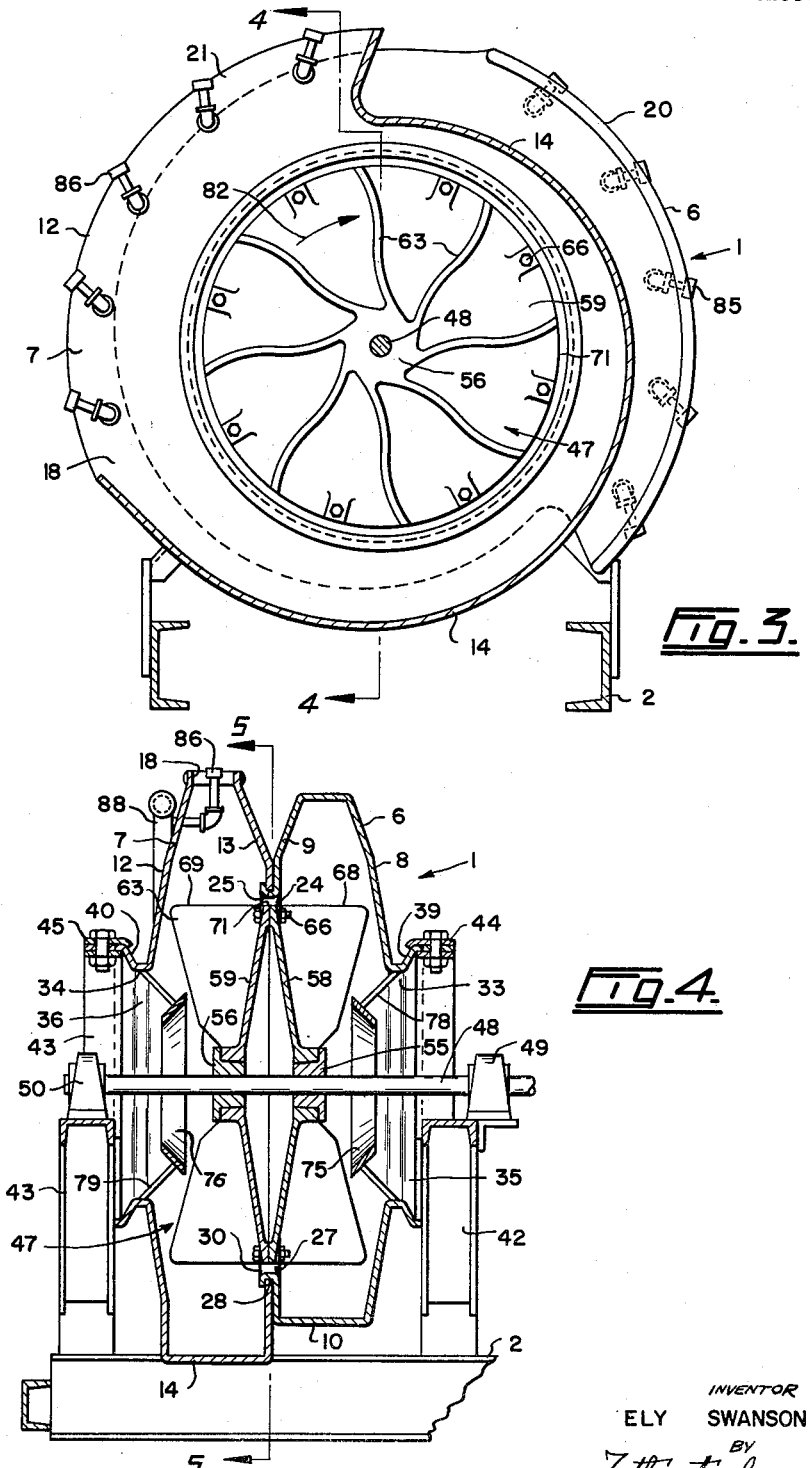
INVENTOR
ELY SWANSON
BY
Fetherstonhaugh & Co.
ATTORNEYS

United States Patent Office 3,138,329
Patented June 23, 1964

3,138,329
AGRICULTURAL SPRAYING APPARATUS
Ely Swanson, Winfield, British Columbia, Canada
Filed Nov. 19, 1962, Ser. No. 238,356
15 Claims. (Cl. 239—77)

This invention relates to apparatus particularly designed for spraying insecticides and fungicides on fruit trees but is not necessarily limited for such uses. In particular, this invention relates to a spraying apparatus in which insecticides or fungicides are airborne outwardly from the machine to the objects to be sprayed.

Spraying apparatus of this type is usually constructed with two air blast units mounted to rotate independently of each other in order to deliver air blasts in any direction radially outwardly from one side to the other of the apparatus. Such apparatus requires a duplication of parts which is expensive and does not, at all times, deliver the same volume and velocity of air from each of the air blast units. The present apparatus, being relatively inexpensive to construct and to maintain, provides a stronger flow of air, adjustable in lateral direction, than it has been possible to achieve with similar apparatus of the prior art.

The present apparatus includes dual fan casings located axially side by side and mounted for relative rotation, said casings having adjacent inner walls with a common central inner opening therebetween and outer walls with central inlet openings therein, each of said casings having a peripheral discharge opening, a fan in and substantially filling the common inner opening, said fan including radial blades thereon in each casing aligned with the discharge opening thereof, said blades being adapted to draw air in through the inlet opening of their respective casings and to discharge said air through their respective discharge openings, and means for directing spray material into and through the discharge air near each discharge opening to be carried thereby away from the apparatus.

Figure 1:
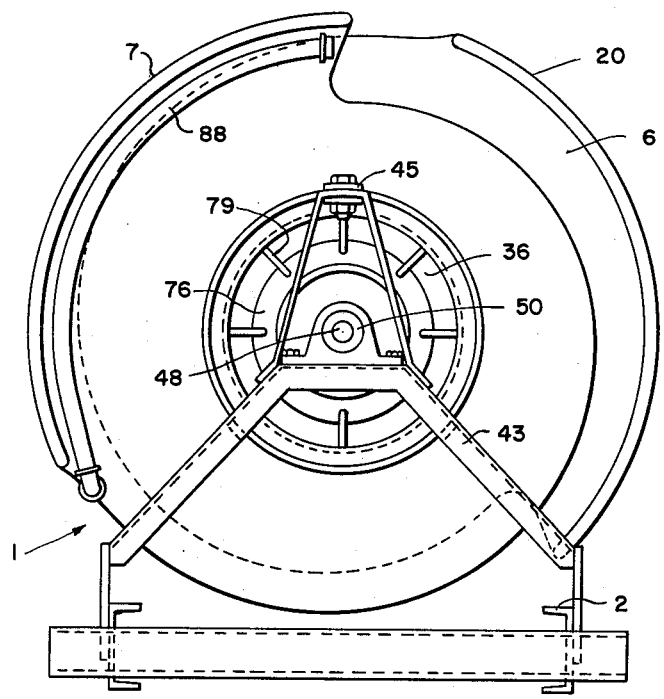
Figure 2:
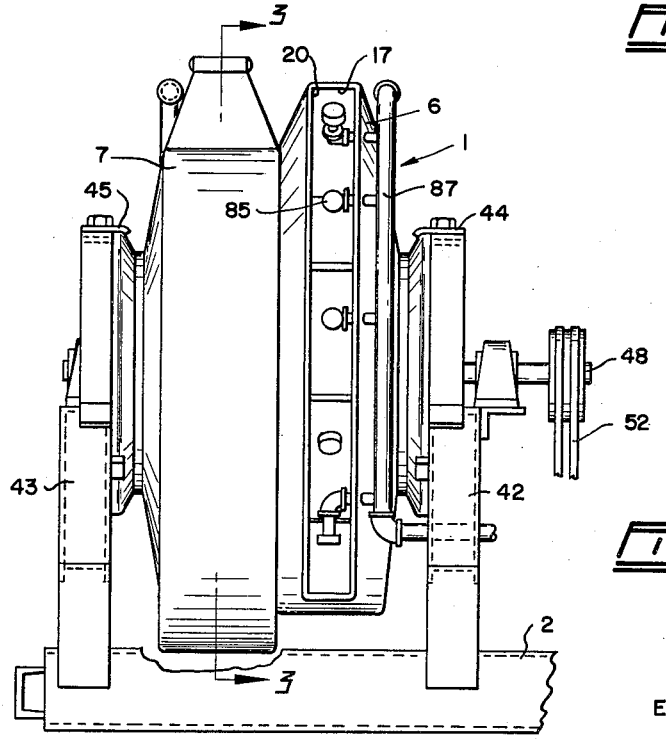
Figure 5:
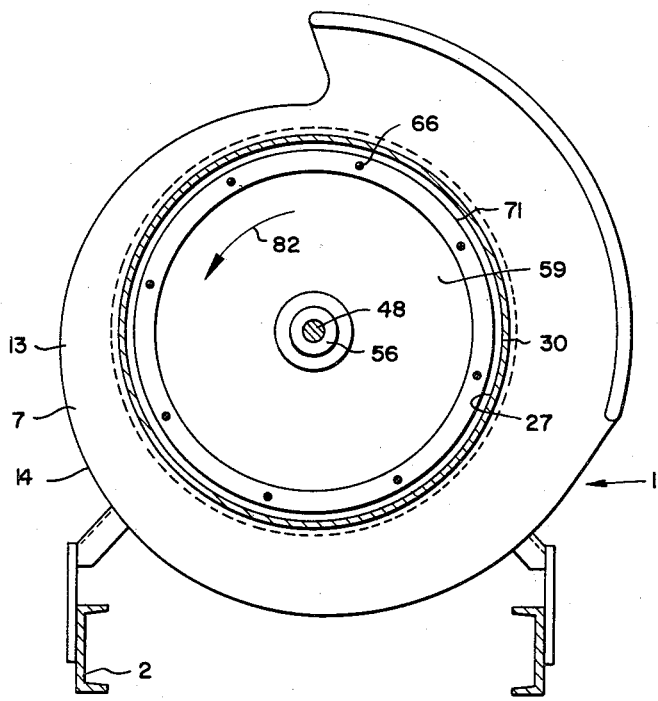

An example of this invention is illustrated in the accompanying drawings, in which:

FIGURE 1 is an end elevation of the apparatus;
FIGURE 2 is a side elevation of the apparatus;
FIGURE 3 is a vertical cross section taken on the line 3—3 of FIGURE 2;
FIGURE 4 is a vertical longitudinal section taken substantially on the line 4—4 of FIGURE 3; and
FIGURE 5 is a vertical cross section taken on the line 5—5 of FIGURE 4.

Referring to the drawings, 1 generally designates spraying apparatus according to the present invention which is mounted on a truck or trailer, not shown, in the usual manner for equipment of this type. Spray material for this apparatus is carried in the usual tank equipment, not shown. The deck or frame 2 of a truck or trailer is shown for carrying apparatus 1.

Spraying apparatus 1 includes dual fan casings 6 and 7. Casing 6 consists of spaced outer and inner walls 8 and 9 connected together at outer edges thereof by a curved peripheral wall 10. Walls 8 and 9 converge outwardly in a radial direction to peripheral convoluted walls 10, as clearly shown in FIGURE 4. Similarly, casing 7 is formed by outwardly converging outer and inner walls 12 and 13, and a peripheral convoluted wall 14. Openings 17 and 18 elongated in a circumferential direction, are formed in peripheral walls 10 and 14, respectively, of casings 6 and 7, and the respective side walls at these openings are shaped to form discharge openings 20 and 21.

By referring to FIGURE 4, it will be seen that inner walls 9 and 13 are abutting annular plates, having circular inner edges 24 and 25 respectively, around large central inner openings 27 and 28, wall 9 having an external flange 30 along inner edge 24 thereof, so adapted to receive and slidably hold the inner edge 25 of wall 13, the journal so achieved permitting casings 6 and 7 to rotate relative to each other while retaining said casings in their proper positions relative to each other. Openings 27 and 28 combine to form a common large opening between casings 6 and 7. Outer walls 8 and 12 also are substantially annular plates having inner edges 33 and 34 around central inlet openings 35 and 36 which are smaller than the inner openings 27 and 28. Annular flanges 39 and 40 project outwardly from inner edges 33 and 34 of walls 8 and 12.

Fan casings 6 and 7 are adjustably mounted on vertical frames 42 and 43 by means of clamps 44 and 45 which releasably grip outer flanges 39 and 40.

A centrifugal fan 47 located in the common opening 27–28 between the two fan casings 6 and 7 is fixedly mounted on a central shaft 48 journalled in suitable bearings 49 and 50, mounted on vertical frames 42 and 43. The fan is driven by a pulley arrangement 52 which is powered by a suitable source of power, not shown. The fan comprises two hubs 55 and 56 keyed to the shaft 48, two annular planarily abutting backing plates 58 and 59 keyed to the hubs 55 and 56, respectively, and fan blades 62 and 63 radiating outwardly from hubs 55 and 56, radially aligned with peripheral outlets 17 and 18, said blades being secured to the backing plates 58 and 59. The backing plates 58 and 59 are fastened to each other by bolts 66. Outer tips 68 and 69 of the fan blades 62 and 63 do not extend beyond the common periphery 71 of the backing plates 58 and 59. The diameter of the periphery 71 of the backing plates is slightly less than the diameter of the common inner openings 27–28 of casings 6 and 7.

Air entering through the axial inlets 35 and 36 is directed by the fan blades radially outwards through openings 17 and 18. There is a tendency for a fan of this type to draw air towards the center, there being a greater degree of vacuum at said center than at the outermost part of the blades. The air turbulence thus created reduces the fan efficiency. Deflector means are therefore provided in each air inlet to direct the entering air outwardly into the fan blades and away from the hub.

In the preferred form of the invention as illustrated, the backing plates 58 and 59 are convexly shaped on their outer surfaces. The convex shape thus deflects the air away from the hub and radially outward into the blades. Further deflecting means comprises conical rings 75 and 76 supported respectively in inlet openings 35 and 36. Rings 75 and 76 diverge radially towards the tips of fan blades 62 and 63. In the present apparatus the conical rings 75 and 76 are connected to the outer flanges 39 and 40 by a plurality of spaced rods 78 and 79. The combination of the convexly shaped backing plates 58 and 59 and the conical rings 75 and 76 effectively and smoothly diverting the air from its entering axial direction radially outwardly into the blades.

In the preferred form of the invention, the blades are of identical nature, wide at their outward tips and tapering inwardly to the hub, as clearly shown in FIGURE 4, each blade radiating outwardly in an ogee curve, see FIGURE 3. Each blade is so disposed on its backing plate that its most radially outward surface convexly faces the direction of rotation of the fan, said direction of rotation being indicated by arrow 82 in FIGURE 3.

The spray material is discharged into the air blast issuing from outlets 17 and 18 by a plurality of radially inclined nozzles 85 and 86 which are fed by pipes 87 and 88. The spray material is pumped from a supply tank, not shown, to nozzles 85 and 86 through pipes 87 and 88.

In operation, the fan 42 draws air into the casings 6 and 7 through inlets 35 and 36 and impels it radially outwardly through outlets 17 and 18 and their discharge nozzles 20 and 21. The spray material supplied under pressure is atomized by nozzles 85 and 86 and is carried by the air blast into the trees or other shrubbery to be sprayed. The spray issuing from nozzles 20 and 21 may be directed in any radial direction simply by loosening the clamps 44 and 45 and revolving the casings 6 and 7 to any angular position relative to the axis of the apparatus, after which the clamps are again tightened.

The combination of the convexly shaped backing plates 58 and 59, deflector rings 75 and 76, and the radially converging fan casings smoothly directs the flow of air from an axial to a radial direction, with a minimum of turbulence and in combination with the fan blade shape provides an air blast of maximum intensity with a minimum power input, thereby greatly reducing costs of operation. Fabrication costs are also reduced as the spraying apparatus is practically one casing which is centrally divided by the fan. Fan 47 substantially fills the common openings 27 and 28 between the two casings so that the air pressure in one casing at a given blade is not affected when said blade passes the discharge opening of the other casing. Furthermore, as the tips of the blades of the fan do not project radially beyond the common periphery 71 of the backing plates, there is little possibility of air being forced from one casing through opening 27 and 28 into the other casing to interfere with proper movement of the air in the latter casing.

What I claim as my invention is:

1. Agricultural spraying apparatus comprising dual fan casings located axially side by side and mounted for relative rotation, said casings having adjacent inner walls with a common central inner opening therebetween and outer walls with central inlet openings therein, each of said casings having a peripheral discharge opening, the inner and outer walls of each casing converging towards each other in a radial direction and to the discharge opening of said casing, a fan in and substantially filling the common inner opening, said fan including radial blades thereon in each casing axially aligned with the inlet opening and radially aligned with the discharge opening thereof, said blades being adapted to draw air in through the inlet opening of their respective casings and to discharge said air through their respective discharge openings, the converging inner and outer walls of said casings causing the air to travel radially straight out through the discharge openings, and means mounted in each discharge opening for directing spray material into the discharge air as said air travels through the opening to be carried thereby away from the apparatus.

2. Agricultural spraying apparatus as claimed in claim 1 in which the inlet openings are smaller than the common inner opening, and including a deflector ring in each inlet opening adjacent inner ends of the fan blades and shaped to direct air entering said opening radially towards and into outer ends of the fan blades.

3. Agricultural spraying apparatus as claimed in claim 1 in which each fan blade diverges from an inner end radially towards an outer end and is radially in the form of an ogee curve, and each blade is disposed with its radially outer surface convexly facing the direction of rotation of the fan.

4. Agricultural spraying apparatus as claimed in claim 3 in which the blades of the fan are mounted on opposite convex faces of a common base positioned in the common inner opening and extending generally normal to the rotational axis of the fan, said faces extending outwardly into the fan casings, and said blades extend radially no farther than said common base.

5. Agricultural spraying apparatus as claimed in claim 1 in which the fan blades diverge radially from inner to outer ends thereof.

6. Agricultural spraying apparatus as claimed in claim 4 in which the common base of the fan comprises a pair of backing plates detachably secured together at peripheral edges thereof.

7. Agricultural spraying apparatus comprising a pair of casings located axially side by side and circumferentially rotatable relative to each other, each casing including outer and inner walls converging in a radial direction to a peripheral wall, the inner walls of said casings being near each other and having central inner openings therein combining to form a common inner opening between the casings and each outer wall having a central inlet opening therein axially aligned with the common inner opening, a discharge opening in each peripheral wall, a fan in and substantially filling the common inner opening, said fan including radial blades thereon in each casing aligned with the discharge opening thereof, said blades being adapted to draw air in through the inlet opening of their respective casings and to discharge said air through their respective discharge openings, the converging inner and outer walls of said casings causing the air to travel radially straight out through the discharge openings, and means mounted in each discharge opening for directing spray material into the discharge air as said air travels through the opening to be carried thereby away from the apparatus.

8. Agricultural spraying apparatus as claimed in claim 7 including means rotatably interconnecting the inner walls of the two casings adjacent the inner openings thereof.

9. Agricultural spraying apparatus as claimed in claim 7 in which the inner walls of the two casings have circular inner edges at the inner openings of said walls, and including an annular flange on one inner wall at the inner opening thereof projecting into the inner opening of the other inner wall rotatably to connect the two casings together, an outer annular flange projecting outwardly from the outer wall of each casing near the inlet opening thereof, and clamping means releasably gripping each outer flange to retain the casing of said outer flange in adjusted position relative to the other casing.

10. Agricultural spraying apparatus as claimed in claim 7 in which the blades of the fan diverge axially outwardly in a radial direction.

11. Agricultural spraying apparatus as claimed in claim 10 in which the fan blades are mounted on opposite faces of a common base and project axially therefrom, said opposite faces being of convex shape.

12. Agricultural spraying apparatus as claimed in claim 11 in which the fan blades extend radially no farther than the common base of the fan, said base just fitting in the common inner opening of the casings.

13. Agricultural spraying apparatus as claimed in claim 10 including a conical deflector ring mounted in each casing near inner ends of the fan blades and centrally of the inlet opening of said casing, each ring diverging axially and inwardly towards the fan blades to direct air entering through the inlet opening to and radially into wide outer ends of the blades.

14. Agricultural spraying apparatus as claimed in claim 7 in which the peripheral wall of each casing extends in an outwardly extending spiral convolution in the direction of rotation of the fan from one end of the discharge opening in said wall to the opposite end of the latter opening.

15. Agricultural spraying apparatus as claimed in claim 7 in which each fan blade diverges from an inner end radially towards an outer end and is radially in the form of an ogee curve, and each blade is disposed with its radially outer surface convexly facing the direction of rotation of the fan.

References Cited in the file of this patent

UNITED STATES PATENTS 2,661,242 Kurzbin _____ Dec. 1, 1953

FOREIGN PATENTS 598,823 Canada _____ May 31, 1960